INVENTOR.
JOHN F. MORSE
BY Ely, Frye & Hamilton
ATTORNEYS

July 10, 1962     J. F. MORSE     3,043,159
SINGLE LEVER CONTROL UNIT
Filed May 8, 1961     3 Sheets-Sheet 2
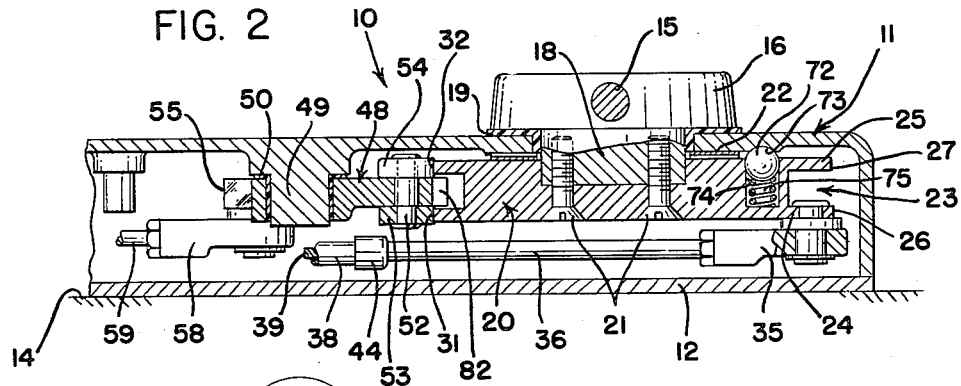
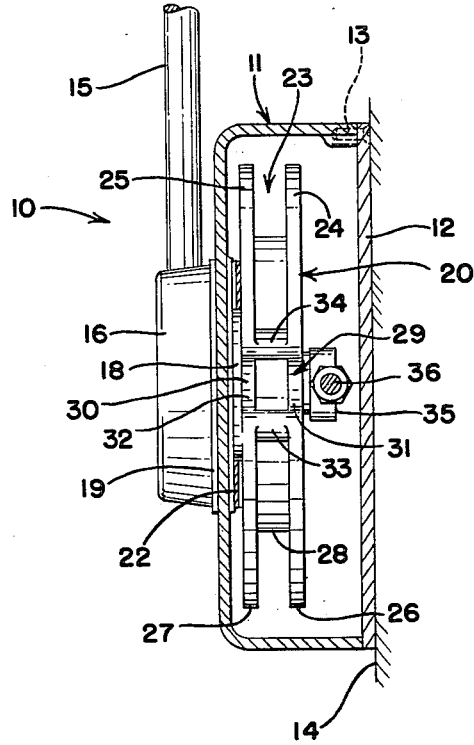
INVENTOR.
JOHN F. MORSE
BY Ely, Frye & Hamilton
ATTORNEYS INVENTOR.
JOHN F. MORSE
BY Ely, Fryer & Hamilton
ATTORNEYS United States Patent Office 3,043,159
Patented July 10, 1962

1

3,043,159
SINGLE LEVER CONTROL UNIT
John F. Morse, 21 Clinton St., Hudson, Ohio
Filed May 8, 1961, Ser. No. 108,462
10 Claims. (Cl. 74—472)

The invention relates generally to single lever control units adapted for operating both the clutch and throttle of an internal combustion engine or other mechanism requiring sequentially operated controls. More particularly, the present invention relates to an improved and simplified mechanism for sequentially operating the throttle and clutch of an engine by a single control lever.

The metamorphosis of single lever control devices from the early Geneva gearing mechanisms, with the undesirably varying rate of motion they impart to control cables, and other early units which necessitated an excessive degree of control lever rotation to effect the shift, through intermittent gearing mechanisms, to the slide block construction taught by the applicant's prior U.S. Patent No. 3,023,869 has been characterized by constant improvement in results from the new mechanisms.

The primary disadvantage of single lever control mechanisms employing multiple rotary elements or intermittent gears is that they "wedge" under certain operating conditions. For example, if an intermittent gear control mechanism is applied to an engine which has a short travel clutch, without the proper adjustment being made in the linkage between the clutch and the control mechanism, the gear operating the clutch will tend to wedge against the other rotatable gear, which generally operates the throttle, at the end of the shift range. This wedging is generally not severe enough to render the control inoperable by preventing the operation of the control lever through the throttle range, but results in forcing the shift lever on the clutch beyond its normal travel which in turn results in the application of a braking action to the movement of the control lever. This increased frictional contact between the gears will eventually gall them sufficiently to permit the one operating the clutch to prematurely rotate or "knuckle under" as the control lever is moved to close the throttle and thereby completely jam the control.

Although the slide block mechanism disclosed in the applicant's prior U.S. Patent No. 3,023,869 can not jam by premature movement of the clutch operating element (i.e., the shuttle block), the amount of throw or travel of the shuttle block is fixed, depending upon the diameter of the wheel drive member, thus limiting its adjustability.

It is, therefore, an important object of the present invention to provide a single lever control device employing multiple rotary members which can not "knuckle under."

It is a further object of the present invention to provide a single lever control device which provides a variable throw clutch control element.

It is another object of the present invention to provide a single lever control device employing multiple rotary members which have no inherent backlash.

It is a further object of the present invention to provide a single lever control device employing a simple and compact mechanism, which is substantially more efficient than other known mechanisms.

2

It is a still further object to provide a single lever control unit which provides one means for engaging the clutch and a separate means for disengaging, so as to provide for greater efficiency and durability in the mechanism.

These and other objects which will become apparent from the following specification are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of this specification.

In general, the present invention provides coordinated control of the throttle and clutch controls through the entire range of operation; the direction of rotation of the control lever from neutral selectively engaging forward or reverse gear, and rotation of the control lever beyond the shifting range advancing the throttle as desired. The control lever is operatively connected to rotate a substantially circular wheel drive member. The throttle control cable is displaced by the rotation of the wheel drive member. The clutch control cable is displaced by a rocker which pivots in response to rotation of the wheel drive member. The clutch control cable is displaced to engage the clutch in either forward or reverse during the initial rotation of the wheel drive member as the control lever is selectively rotated from neutral. The wheel drive member then cooperates to lock the rocker when the former is further rotated to advance the throttle. As the control lever is returned to neutral, the wheel drive member effects a closing of the throttle and then reversely pivots the rocker to disengage the clutch from forward or reverse drive position. This coordination of the wheel drive member and the rocker is obtained by the interaction of an omega-shaped or lobated cam surface on the rocker with two circumferentially spaced pins at the periphery and parallel to the axis of the wheel drive member to disengage the clutch from forward or reverse and the interaction of rollers mounted at the central apex of the lobated cam surface with axially aligned cammed indentations in the periphery of the wheel drive member between the circumferentially spaced pins to engage the clutch in forward or reverse.

Referring to the drawings:

FIG. 2 is an enlarged cross section taken substantially on line 2—2 of FIG. 1;

FIG. 3 is an enlarged cross section taken substantially on line 3—3 of FIG. 1, with the rocker removed.

Figure 1:
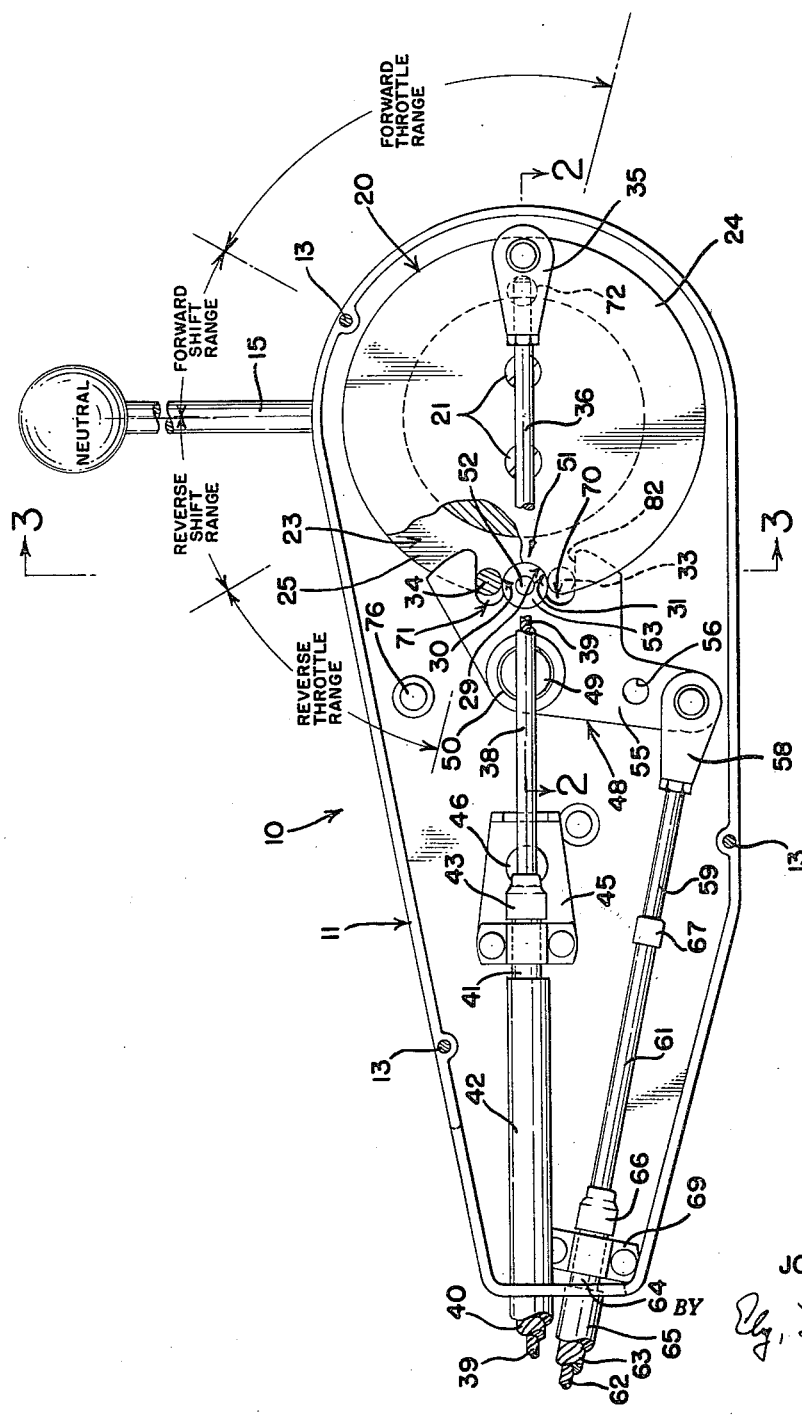
FIG. 1 is a rear side elevation of a single lever control unit embodying the invention, with the cover plate removed, showing the control lever in neutral position.

Referring particularly to FIGS. 1 and 2, the control unit, designated generally by the numeral 10, has a housing 11 to which a rear plate 12 may be attached, as by screws 13. Rear plate 12 is adapted for attachment to a mounting pad 14 in the side of a boat by means not shown, or two like housings may be mounted back-to-back for twin engine controls.

A control lever 15 extends radially outwardly of hub 16, which is formed on the axially outer end of control shaft 18. Shaft 18 is journaled in housing 11, and a flanged sleeve bearing 19 is preferably interposed between shaft 18 and housing 11. A wheel drive member 20 is non-rotatably secured to shaft 18, as by cap screws 21. Braking friction may be provided to prevent undesirable rotation of wheel drive member 20 by positioning a wavy spring washer 22 between member 20 and the adjacent portion of housing 11. Braking friction is especially desirable if the unit is subjected to vibration or if the mechanisms being operated are in any way spring loaded, as would be the case if a spring governor were provided.

The circular wheel drive member 20 is secured to shaft 18 so as to rotate therewith about their common axis. An annular groove or recess 23 (also see FIG. 3) is provided medially of the circumferential edge of member 20 forming rims 24 and 25. The breadth of the rims 24 and 25 in this sheave-like configuration is sufficient to provide annular bearing surfaces 26 and 27. Indentations 29 and 30 in the rims 24 and 25, respectively, are aligned with each other and are defined by identical cam surfaces 31 and 32. Circumferentially spaced pins, or pin-like portions, 33 and 34, one on each side of the aligned indentations 29 and 30, extend between rims 24 and 25.

A swivel connection 35 is provided on the axially outer side of rim 24 in proximity to its peripheral edge and is attached to the end of a push rod 36 which telescopes within a sleeve 38. Push rod 36 is secured by a suitable means, not shown, to the end of the core 39 of a push-pull cable 40 for operating a throttle and, in the neutral position of FIG. 1, the push rod passes over the center or axis of wheel 20. Sleeve 38 has a swivel connection with the front end of a mounting bushing 41 secured to sheath 40 for cable core 39. Sheath 40 preferably has a plastic cover 42. Resilient sealing sleeves 43 and 44, which act as a moisture seal, may be provided at the joint between the bushing and sleeve 38, and at the juncture of the sleeve 38 and push-rod 36, respectively.

Mounting bushing 41 is preferably secured in a swivel clip 45 of the type shown in the applicant's U.S. Patent No. 2,975,653. Clip 45 is pivotally mounted on bolt 46 which secures it to housing 11. The use of a clip 45 mitigates undesirable binding of the core 39.

It is readily apparent that by locating the swivel connection 35 180° from the position shown in FIG. 1, when the throttle is in neutral position, the unit can easily be adapted to operate a "pull-to-open" rather than a "push-to-open" throttle.

A rocker 48 is pivotally mounted on shouldered stub shaft 49 which extends inwardly of housing 11, and a sleeve bearing 50 is preferably interposed therebetween. Shaft 49 is located within sufficient proximity to wheel drive member 20 so that a portion of rocker 48 is received within recess 23. Provided on one edge of the portion of rocker 48 within recess 23 is a lobated cam, indicated generally by the numeral 51. A pin 52 extends transversely through rocker 48 at the central apex of lobated cam 51. Rollers 53 and 54 are journaled on pin 52, one on each side of rocker 48. As will be more fully described, roller 53 is adapted to cooperate with rim 24 and roller 54 is identically adapted to co-operate with rim 25.

A portion of rocker 48 defines a throw arm 55 which is angularly disposed to cam 51. One or more holes 56 is provided through arm 55 for selective mounting of a swivel connector 58, to which is attached the end of a push-rod 59. The angle at which arm 55 is disposed is preferably such that in neutral position push rod 59 is perpendicularly aligned therewith. This disposition results in the greatest axial displacement of push rod 59 for a given angular rotation of rocker 48. A preselected axial displacement of rod 59 for a given rotation of rocker 48 is available by mounting connector 58 in proper hole 56. The end of push rod 59 which telescopes into sleeve 61 is secured, by suitable means not shown, to the core 62 of a push-pull cable for operating a clutch. Sleeve 61 has a swivel connection with the front end of a mounting bushing 64 secured to the sheath 63 for cable core 62. Sheath 63 preferably has a plastic cover 65. Resilient sealing sleeves 66 and 67 are similarly provided at the joint between the bushing 64 and sleeve 61, and at the juncture of sleeve 61 and push rod 59. Bushing 64 is secured to housing 11 by bracket clamp 69. A swivel clip similar to clip 45 need not be used because of the substantially straight line reciprocation imparted to core 62.

Because of the mirrored interaction of the elements comprising the control units through forward or reverse range, the operation of the unit will only be described through forward range.

In the neutral position (FIG. 1) roller 53 rests within indentation 29 and roller 54 similarly rests within indentation 30; pins 33 and 34 are embraced within recesses 70 and 71 of cam 51, respectively.

Preferably, the control lever 15 is yieldingly held in neutral position by a spring biased ball 72 received in a detent notch 73 in housing 11. As shown in FIG. 2, the recess 74 for spring 75 is integrally formed in wheel drive member 20.

When the control lever 15 is rotated from neutral approximately 30° in either direction, only a slight displacement of push-rod 36 and cable 39 is caused because wheel drive 20 and push-rod 36 are swinging in the same general direction on different arcs. This slight displacement of push-rod 36 is normally absorbed by the backlash in the cable and in the throttle linkage, to which cable 40 is attached, at the engine, without causing advance of the throttle. In this range of movement, the indentations 29 and 30 pivotally drive rocker 48 via their engagement with rollers 53 and 54, and the rocker 48 is pivotally rotated counter the rotation of member 20 to operate the clutch mechanism to which cable 63 is attached. These rollers 53 and 54 remain in contact with member 20 as they roll upwardly along cam surfaces 31 and 32 toward and onto bearing surfaces 26 and 27 on rims 24 and 25, respectively.

Figure 4:
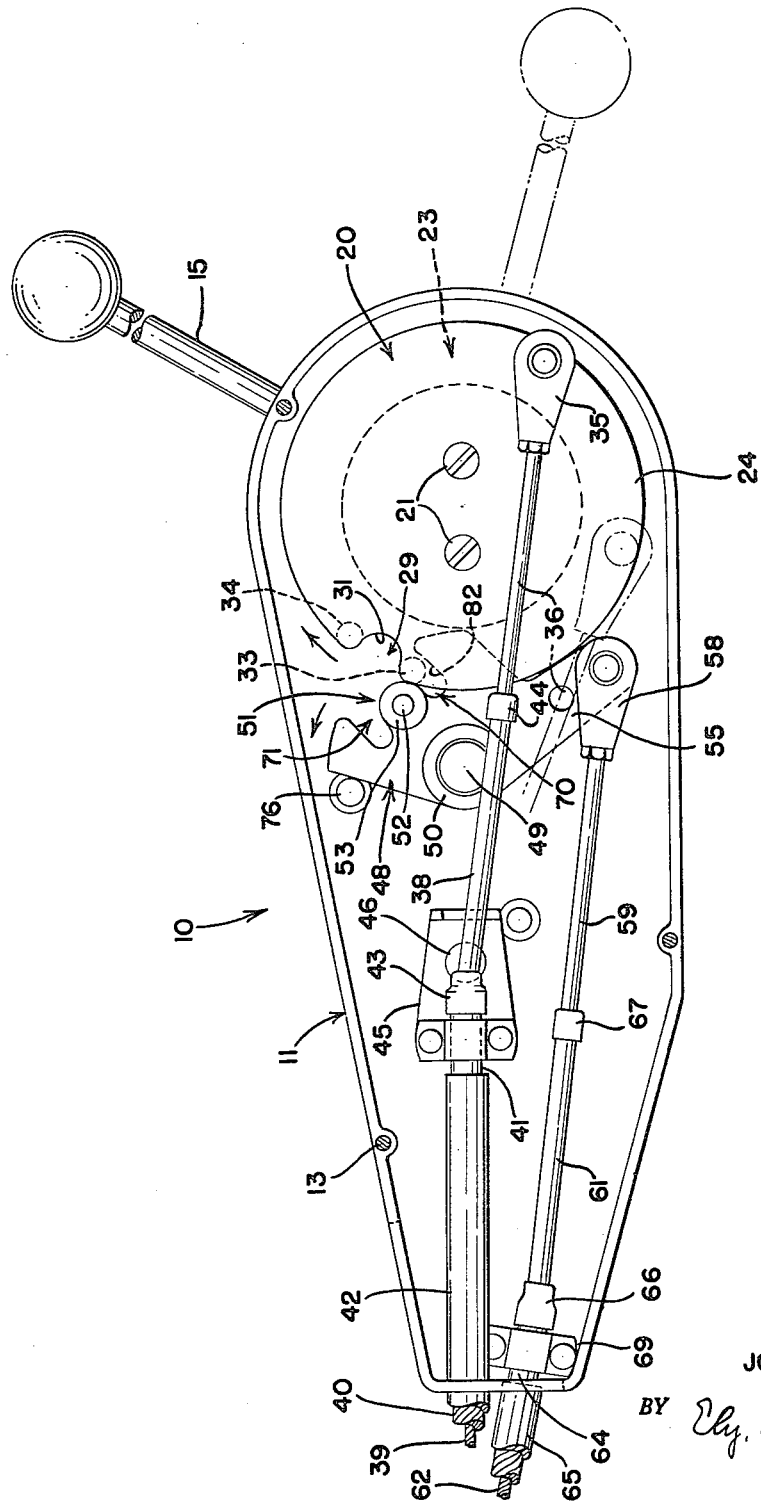
FIG. 4 is a view similar to FIG. 1 with the control lever having been moved through forward shift range; also showing in phantom the control lever having been moved into forward throttle range.

Continued rotation of control lever 15 beyond the idle forward position depicted in FIG. 4, in which the forward gear has been engaged, as for example, to the phantom representation, will displace the throttle control cable core 39 to advance the throttle. This continued rotation of control lever 15 imparts no further pivoting of rocker 48 which is then maintained in its pivoted position between bearing surfaces 26 and 27 by the limit stop on the clutch shifting lever, reacting through the push-pull cable; and preferably a positive stop pin 76 is also provided. Because of the roller contact of rocker 48 with member 20, there is not only no galling between the members but "knuckling under" and "wedging" are also prevented even though a maladjustment of the linkage may cause a slight jamming against the clutch limit stop.

Counter rotation of the control lever 15 from the forward throttle range to idle forward closes the throttle in preparation for shifting from forward to neutral. As the control lever 15 is rotated from idle forward toward neutral, pickup pin 33 engages the initial engaging surface 82 of the lower recess 70 of cam 51. When the control lever 15 is rotated from idle reverse toward neutral, pickup pin 34 similarly engages the upper recess 71 of cam 51.

It should now be apparent that the elements responsible for engaging the clutch are not used to disengage the clutch, and vice versa. This concept enables the shifting elements to be constructed to perform their specific function without the compromising considerations which would be necessitated if the driving elements were to perform dual or multiple functions. Devices utilizing the same rotary elements for both engaging and disengaging the clutch, such as various forms of intermittent gearing, must compromise between these two motions, which results in some inefficiency in each direction. A single lever control unit according to the present invention makes possible the maximum efficiency and durability of one mechanism to engage the clutch and a maximum efficiency and durability of a second mechanism to disengage the clutch.

This utilization of each mechanism to perform a single function also eliminates backlash in the interacting elements and increases the efficiency by eliminating intermediate elements and applying a linear motion to the clutch actuating elements. This configuration of the clutch control elements also resists binding or jamming of the elements when attempting to shift against a restriction, as, for example, in an outboard motor, when a shift is attempted with the motor not running and the clutch dogs not in position for engagement.

What is claimed is:

1. A single lever control unit for the throttle and the clutch of an engine comprising, a control lever, a wheel drive member rotatable by said control lever from a neutral position to operate a throttle, a rocker to operate a clutch, means to pivot said rocker in response to the first portion of rotation from neutral of said wheel drive member, and separate means to pivotally reverse said rocker during the return rotation to neutral of said wheel drive member.

2. A single lever control unit for the throttle and the clutch of an engine comprising, a control lever, a wheel drive member rotatable by said control lever from a neutral position to operate a throttle, a rocker to operate a clutch, means to pivot said rocker in response to the first portion of rotation from neutral of said wheel drive member, means to lock said rocker in pivoted position during continued rotation of said wheel drive member beyond said first portion, and separate means to pivotally reverse said rocker during the return rotation to neutral of said wheel drive member.

3. A single lever control unit for operating the throttle and clutch of an engine comprising, a control lever, a wheel drive member rotatable by said control lever from a neutral position in either direction to operate a throttle, a rocker to operate a clutch, means on said wheel drive member to pivot said rocker during the first portion of rotation of said wheel drive member from neutral position in either direction, and separate means on said wheel drive member to pivotally return said rocker to neutral position when rotation of said wheel drive member is reversed.

4. A single lever control unit for operating the throttle and clutch of an engine comprising, a control lever, a wheel drive member rotatable by said control lever from a neutral position in either direction to operate a throttle, a rocker to operate a clutch, means on said wheel drive member to pivot said rocker during the first portion of rotation of said wheel drive member from neutral position in either direction, means to lock said rocker in said pivoted position during continued rotation of said wheel drive member beyond said portion of rotation, and separate means on said wheel drive member to pivotally return said rocker to neutral position when rotation of said wheel drive member is reversed.

5. A single lever control unit for the throttle and clutch of an engine comprising, a control lever having a neutral position and movable through a shifting range and then through a throttle advance range, a circular wheel drive member rotatable by said control lever to operate a throttle, a cam indentation on the periphery of said wheel drive member, a rocker to operate a clutch, cam engaging means on said rocker adapted to interact with said cam indentation to pivot said rocker during rotation of said control lever through said shifting range, and separate means to pivotally return said rocker during return rotation of said control lever through said shifting range.

6. A single lever control unit for the throttle and clutch of an engine comprising, a control lever, having a neutral position and movable through a shifting range and a throttle advance range, a circular wheel drive member rotatable by said control lever to operate a throttle, a cam indentation on the periphery of said wheel drive member, a rocker to operate a clutch, cam engaging means on said rocker adapted to interact with said indentation to pivot said rocker during rotation of said control lever through said shifting range, a lobated cam on said rocker, and pickup means on said wheel drive member, said pickup means engaging said lobated cam to pivotally reverse said rocker during return rotation of said control lever through said shifting range.

7. A single lever control unit for the throttle and the clutch of an engine comprising, a control lever having a neutral position and movable through a shifting range and a throttle advance range, a circular wheel drive member rotatable by said control lever to operate a throttle, a cam indentation on the periphery of said wheel drive member, a rocker to operate a clutch, cam engaging means on said rocker adapted to interact with said cam indentation to pivot said rocker during rotation of said control lever through said shifting range, means to lock said rocker in pivoted position when said control lever is rotated through said throttle advance range, a lobated cam on said rocker, and pickup means on said wheel drive member, said pickup means engaging said lobated cam to pivotally return said rocker during return rotation of said control lever through said shifting range.

8. A single lever control unit for the throttle and clutch of an engine comprising, a control lever having a neutral position and movable through a shifting range and a throttle advance range, a circular wheel drive member rotatable by said control lever to operate a throttle, a cam indentation on the periphery of said wheel drive member, a rocker, a throw arm and a lobated cam on said rocker, said throw arm adapted to be operatively connected to a clutch, cam engaging means on said rocker adapted to interact with said cam indentation to pivot said rocker during rotation of said control lever through said shifting range, means to lock said rocker in pivoted position when said control lever is rotated through said throttle advance range, pickup means on said wheel drive member, said pickup means engaging said lobated cam to pivotally return said rocker during return rotation of said control lever through said shifting range.

9. A single lever control unit for the throttle and clutch of an engine comprising, a control lever having a neutral position and movable through a shifting range and a throttle advance range, a circular wheel drive member rotatable by said control lever to operate a throttle, a cam indentation on the periphery of said wheel drive member, a rocker, a throw arm and a lobated cam on said rocker, a series of holes on said throw arm for selective perpendicular connection to a clutch linkage, cam engaging means on said rocker adapted to interact with said cam indentation to pivot said rocker during rotation of said control lever through said shifting range, means to lock said rocker in pivoted position when said control lever is rotated through said throttle advance range, pickup means on said wheel drive member, said pickup means engaging said lobated cam to pivotally return said rocker during return rotation of said control lever through said shifting range.

10. A single lever control unit for the throttle and clutch of an engine comprising, a control lever having a neutral position and movable through a shifting range and a forward and reverse throttle advance range, a circular wheel drive member rotatable by said control lever to operate a throttle, peripheral rims on said wheel drive member defining an annular recess therebetween in the circumferential edge of said wheel drive member, axially aligned cam indentations on said rims, pickup pins disposed between said rims on each side of said cam indentations, a rocker pivoted exteriorly of and partially swingable within said annular recess, a lobated cam having an apex on said rocker, a throw arm on said rocker, a series of holes on said throw arm for selective perpendicular connection to a clutch linkage, a roller journaled on each side of said rocker at the apex of said lobated cam, said rollers adapted to interact with said cam indentations to pivot said rocker during rotation of said control lever from neutral to either of said shifting ranges, means to lock said rocker in pivoted positions when said control lever is rotated through either of said throttle advance ranges, slanted engaging surfaces on said lobated cam, said pickup pins selectively engaging said slanted engaging surfaces on said lobated cam to pivotally return said rocker at a substantially constant rate of displacement during return rotation of said control lever at a correspondingly constant rate through said shifting ranges.

No references cited.